US009830587B1

(12) United States Patent
Bell et al.

(10) Patent No.: US 9,830,587 B1
(45) Date of Patent: Nov. 28, 2017

(54) SYSTEM, METHOD, AND DEVICE FOR CUSTOMIZING ONLINE MERCHANT PAYMENT FORMS FOR MOBILE DEVICES WITHOUT MERCHANT INTEGRATION

(71) Applicant: Sprint Communications Company L.P., Overland Park, KS (US)

(72) Inventors: Timothy L. Bell, Shawnee, KS (US); Sai Suresh Ganesamoorthi, Overland Park, KS (US); Hemant Tiwari, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 602 days.

(21) Appl. No.: 13/714,178

(22) Filed: Dec. 13, 2012

(51) Int. Cl.
*G06Q 20/22* (2012.01)

(52) U.S. Cl.
CPC .................. *G06Q 20/227* (2013.01)

(58) Field of Classification Search
CPC .. G06Q 20/3278; G06Q 20/40; G06Q 20/363; G06Q 20/32; G06Q 20/4012; G06Q 20/353; G06Q 20/325; G06Q 20/401; G06Q 30/0268
USPC .......................................................... 705/41
See application file for complete search history.

(56) References Cited

U.S. PATENT DOCUMENTS

| 7,523,486 | B1 | 4/2009 | Turner |
| 8,099,363 | B1 | 1/2012 | Kilchenstein |
| 8,151,328 | B1 | 4/2012 | Lundy et al. |
| 8,352,370 | B1 | 1/2013 | White et al. |
| 2002/0107755 | A1 | 8/2002 | Steed et al. |
| 2006/0265327 | A1* | 11/2006 | Rao ........................ G07G 1/00 705/40 |
| 2007/0156436 | A1 | 7/2007 | Fisher et al. |
| 2009/0271246 | A1 | 10/2009 | Alvarez et al. |
| 2010/0161433 | A1 | 6/2010 | White |
| 2011/0078081 | A1 | 3/2011 | Pirzadeh et al. |
| 2011/0208658 | A1 | 8/2011 | Makhotin |
| 2012/0029990 | A1 | 2/2012 | Fisher |

(Continued)

OTHER PUBLICATIONS

Restriction Requirement dated Jan. 23, 2017, U.S. Appl. No. 14/258,882, filed Apr. 22, 2014.

(Continued)

*Primary Examiner* — Kito R Robinson
*Assistant Examiner* — Michael Cranford

(57) ABSTRACT

A system, method and device for customizing online merchant payments for mobile devices without merchant integration are provided. In an embodiment, a mobile device monitors a state of a web-based session between the mobile device and an online merchant and detects and intercepts a payment form received from an online merchant for entering payment information to complete a purchase transaction with the online merchant. The mobile device displays a list of one or more payment types available for selection to complete the purchase transaction. The user selects and payment type and the mobile device retrieves associated payment information from a server based on the payment type selected by the user. The mobile device populates fields of the payment form with the retrieved payment information, displays the populated payment form to the user for confirmation to complete the purchase transaction, and submits the populated payment form to the online merchant.

18 Claims, 9 Drawing Sheets

(56) References Cited

U.S. PATENT DOCUMENTS

| | | | |
|---|---|---|---|
| 2012/0150667 A1 | 6/2012 | Salari | |
| 2012/0289188 A1 | 11/2012 | Marcus et al. | |
| 2013/0013499 A1* | 1/2013 | Kalgi | G06Q 20/12 705/41 |
| 2013/0054320 A1 | 2/2013 | Dorso et al. | |
| 2013/0198066 A1* | 8/2013 | Wall | G06Q 20/3278 705/41 |
| 2013/0268752 A1 | 10/2013 | Morecki et al. | |
| 2014/0359484 A1 | 12/2014 | Morecki et al. | |
| 2015/0081435 A1 | 3/2015 | Griffiths | |
| 2015/0101062 A1 | 4/2015 | Silver et al. | |
| 2015/0110257 A1 | 4/2015 | Barbulescu et al. | |
| 2015/0302470 A1 | 10/2015 | Dru et al. | |

OTHER PUBLICATIONS

Gailloux, Michael A., et al., "Companion Applets for Web-Based Transactions," filed Apr. 22, 2014, U.S. Appl. No. 14/258,882.

Advisory Office Action dated Oct. 12, 2016, U.S. Appl. No. 14/313,968, filed Jun. 24, 2014.

Final Office Action dated Jun. 14, 2016, U.S. Appl. No. 13/759,034, filed Feb. 4, 2013.

FAIPP Office Action dated Jun. 8, 2016, U.S. Appl. No. 14/313,968, filed Jun. 24, 2014.

Final Office Action dated Aug. 12, 2016, U.S. Appl. No. 14/313,968, filed Jun. 24, 2014.

Restriction Requirement dated Mar. 19, 2015, U.S. Appl. No. 13/759,034, filed Feb. 4, 2013.

FAIPP Pre-Interview Communication dated Sep. 14, 2015, U.S. Appl. No. 13/759,034, filed Feb. 4, 2013.

Gailloux, Michael A., et al., "Companion Applets for Web-Based Transactions," filed Feb. 4, 2013, U.S. Appl. No. 13/759,034.

FAIPP Pre-Interview Communication dated Apr. 1, 2016, U.S. Appl. No. 14/313,968, filed Jun. 24, 2014.

Gailloux, Michael A., et al., "System for Easing Customer Data Entry from Internet Advertising," filed Jun. 24, 2014, U.S. Appl. No. 14/313,968.

FAIPP Office Action dated Dec. 8, 2015, U.S. Appl. No. U.S. Appl. No. 13/759,034, filed Feb. 4, 2013.

Dashlane, "Instant checkout, smart auto fill, secure passwords—Dashlane", https://dashlane.com/, last accessed Nov. 9, 2012.

Dashlane, "Secure encryption of your personal—Dashlane", https://dashlane.com/en/security, last accessed Nov. 9, 2012.

Dashlane, "Dashlane Security Whitepaper—Protection of User Data in Dashlane", Dashlane, Nov. 2011.

Dashlane, "Checkout easily online using Dashlane", https://dashlane.com/en/features, last accessed Nov. 9, 2012.

Dashlane, "Dashlane lets you fill out forms with a single click", https://dashlane.com/en/features/smartformfilling, last accessed Nov. 9, 2012.

Dashlane, "Securely Share web account passwords and important notes", https://dashlane.com/en/features/securesending, last accessed Nov. 9, 2012.

Notice of Allowance dated Jun. 16, 2017, U.S. Appl. No. 13/759,034, filed Feb. 4, 2013.

Office Action dated Jun. 15, 2017, U.S. Appl. No. 14/258,882, filed Apr. 22, 2014.

* cited by examiner

SYSTEM, METHOD, AND DEVICE FOR CUSTOMIZING ONLINE MERCHANT PAYMENT FORMS FOR MOBILE DEVICES WITHOUT MERCHANT INTEGRATION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In the field of electronic commerce, merchants are able to sell a variety of goods and services online. An online merchant may be, for example, a traditional merchant of goods with an online presence, a catalog merchant with an online presence, a web-only merchant, or a provider of services. In order for any of these merchants to sell goods and services online, customers must be able to make a payment to the merchant for the goods and services purchased.

Typically, completing an online purchase entails the customer providing several pieces of information, for example, billing name and address, shipping information and address, payment type, payment information, etc. Each online merchant may define the pieces of information it collects from a customer to complete a purchase. The required pieces of information are indicated to the customer in a payment form. On average, while completing a typical purchase, the customer may provide ten to twelve pieces of information in a payment form of an online merchant.

SUMMARY

In an embodiment, a mobile device for simplifying a purchase transaction comprises a memory, a processor, and an application stored in memory that, when executed by the processor monitors a state of a web-based session between the mobile device and an online merchant, detects and intercepts a payment form received from an online merchant for entering payment information to complete the purchase transaction with the online merchant, and displays a list of one or more payment types available for selection to complete the purchase transaction. The application further retrieves associated payment information from a server based on the payment type selected by the user from the list of one or more payment types, populates fields of the payment form with the retrieved payment information, displays the populated payment form to the user for confirmation to complete the purchase transaction, and submits the populated payment form to the online merchant on confirmation by the user.

In an embodiment, a method for simplifying online purchase transactions comprises presenting a list of one or more online merchants to a user of a mobile device for establishing an online shopping session, the one or more online merchants pre-processed to support simplifying online purchase transactions, detecting a checkout page received from one of the one or more online merchants, the checkout page containing fields for entering payment information to complete the online purchase transaction with the one of the one or more online merchants during the established online shopping session, displaying one or more payment types available for selection to complete the online purchase transaction with the one of the one or more online merchants, retrieving associated payment information from a server based on the payment type selected from the one or more payment types by the user, populating the fields of the checkout page with the retrieved payment information, displaying the populated checkout page to the mobile device user for confirmation to complete the online purchase, and submitting the populated checkout page to the one of the one or more of online merchants.

In an embodiment, a media access gateway device for simplifying completion of online purchase transactions comprises a memory, a processor, and an application stored in the memory that, when executed by the processor monitors the state of a web-based purchase transaction between a mobile device and an online merchant. The application further detects, based on the state of the web-based purchase transaction, a form received from one of a plurality of online merchants for entering payment information to complete an online purchase transaction with the one of a plurality of online merchants and retrieves payment information associated with a payment type from a server based on selection of the payment type from a list of payment types by a user for completing the online purchase transaction. The application then populates the input fields of the form with the selected payment information, provides the populated form to the mobile device for confirmation from the user to complete payment for the online purchase transaction using the selected payment type and the associated payment information, and submits the populated form to the online merchant.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
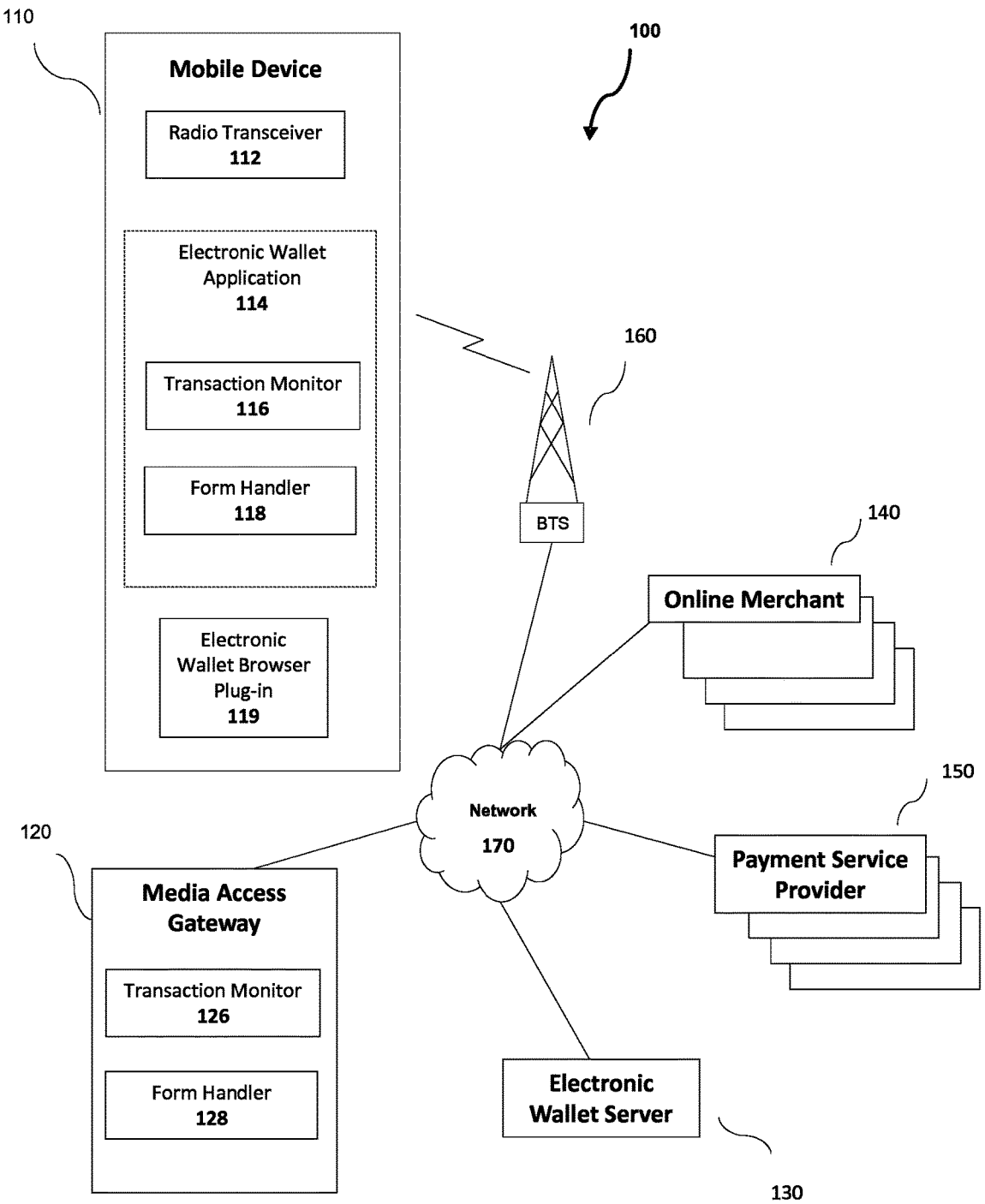
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

Online merchants generally provide a merchant-specific payment form to customers to collect payment and customer information, such as shipping address, from a customer. In some instances, online merchants may provide methods that make completing the payment form easier and quicker for the customer making a purchase. For instance, an online merchant may automatically remember a customer from a previous purchase transaction and pre-fill the customer's information at checkout during a current purchase transaction. In another instance, the online merchant may be able to determine a portion of the customer information, for example, by reading the customer's cookies file, and pre-fill the form with the information. In another instance, the online merchant may allow the customer to store payment and other customer information directly with the online merchant. During a subsequent purchase, the online merchant retrieves the stored customer's information and the customer may select the stored information preferred for completing the purchase transaction.

In other instances, an online merchant may allow a customer to pay through a third party system, such as the PayPal™ third party payment system. If the customer selects the third party payment system, the merchant is removed from payment processing, which is now between the third party and the customer. The third party system may act as a "middle man" to collect payment from the customer which is then remitted to the online merchant. For an online merchant to support an association with a third party payment system, the online merchant may be expected to invest its own resources in integrating its system with the third party payment system, as well as in continuing to maintain the association between the systems.

When a customer is shopping on a home or work computer, entering the customer and payment information using a standard keyboard to complete a purchase transaction may not be too tedious or even inconvenient for the customer. However, when a customer is using a mobile device, such as a mobile phone, smart phone, PDA, or other mobile device, a customer may abandon a potential purchase because inputting the information for ten to twelve fields using the keypad or touch screen of the mobile device is prohibitive. The relationship of the number of consumers who select items for purchase, for example, by placing items in their shopping cart, and the number of consumers who go on to purchase the selected items may be called the conversion rate. When customers fail to complete purchases using mobile devices, the conversion rate for online merchants decreases. With the ubiquity of mobile devices, merchants are looking for ways to increase the conversion rate for mobile devices.

Neither a merchant-specific solution nor a third party payment solution is optimal for improving ease of completing a purchase for a mobile user. Each merchant-specific checkout process may be unique so a customer may encounter as many payment forms as there are online merchants. Online merchants who provide the third party payment option merely add another layer to the merchant's checkout page which may oblige the user to navigate the third party checkout page before completing a purchase with the merchant. Further, any online customer using a third party payment system typically must create another account with the third party payment system and provide his or her payment information, for example, credit/debit card numbers, to the third party payment system. This creates the potential for more exposure of the customer's private payment information as more systems have the customer's information. As such, there is no one simplified direct payment option for a mobile user that may be used with more than one online merchant.

Similarly, neither the merchant-specific solution nor the third party payment solution is optimal for the merchant. As noted, a merchant may expend its own resources to integrate and maintain an association with a third party system. Further, because the third party payment system acts as a "middle man", the channels for the merchant to issue refunds, etc. may be complicated. The "middle man" may also be reflected as the merchant on credit/debit card statements rather than the actual online merchant. Using the third party payment system effectively prevents the online merchant from performing direct transactions with the customer.

As such, neither an individual online merchant nor a third party payment system is capable of providing a mobile user with a direct payment method to the merchant that is 1) applicable for all merchants, 2) transparent to all merchants, 3) no cost to the merchants, and 4) that may be simplified at the mobile device for providing mobile device customers an easy checkout process. In an embodiment, this functionality may be provided by the mobile device or at a point of network access to the mobile device which may be controlled by a wireless communications service provider.

Accordingly, the wireless service provider may provide the necessary functionality on the mobile devices or at the network access point for presenting a common user interface to mobile devices for completing purchases. Merchant integration in other solutions typically entails development, testing, and maintenance by the online merchant to support capabilities of the mobile device. Merchant integration is generally required in order for an online merchant to adapt its merchant-specific payment form or any other part of its payment system with an external payment system or process. According to the teachings of the present disclosure, however, to provide the common user interface functionality for online merchant payment forms, the wireless service provider adapts the functionality at the mobile device or the media access gateway in order to support each merchant-specific form. That is, the wireless communications service provider integrates a merchant-specific form for use with the common user interface, thereby customizing the merchant-specific payment form. Because the wireless service provider provides the adapted functionality and performs the integration of the merchant-specific form at the mobile device or network access point, an online merchant need not modify its merchant-specific payment form or perform merchant integration with the wireless communications service provider's functionality. Thus, an online merchant benefits from the common user interface without any effort, while the wireless communications service provider manages adaptation of the functionality and integration of each merchant-specific form with the common user interface.

Several embodiments for customizing online merchant payment forms for mobile devices are presented herein. An embodiment may provide a common user interface to mobile device users for making direct payment for purchases from multiple online merchants, regardless of the merchant-specific payment form. After a mobile device user completes an online shopping session with an online merchant and chooses to purchase selected items or services, for example, items or services in the mobile device user's shopping cart, the online merchant transmits its merchant-specific payment form to the mobile device to collect direct payment. By making a direct payment, the mobile device user may provide his or her payment information directly to the online merchant. In an embodiment, the merchant-specific payment form is intercepted prior to being displayed on the mobile device, either at the mobile device or at the network access point. Instead of displaying the merchant-specific payment form on the mobile device, a list of payment types previously defined and stored by the mobile device user is retrieved and presented to the mobile device user. The mobile device user may then select the payment type. The payment type may be a description of the type of payment, for example, MasterCard, Dad's Credit Card, John's Debit Card. Then, the payment information associated with the payment type is retrieved, and the payment form is automatically populated for the mobile device user. Examples of the payment information may be the actual credit/debit card number, PINs, security codes, or other passwords. The payment information is then populated for the mobile device user into a merchant-specific form. This embodiment supports different merchant-specific forms transmitted by various online merchants to provide a common user interface to the mobile device user.

The present disclosure provides a system, method and device for customizing online merchant-specific payment forms for mobile devices, independent of the online merchant and without requiring merchant integration. Customization of merchant-specific payment forms into a common user interface provides a unified and simple interface for mobile devices to easily complete purchases via direct payment to an online merchant. An additional feature of providing a common user to a mobile device user is that a wireless communication service provider of the mobile device may collect information regarding purchase transactions for a variety of online merchants. The information collected may be used to show added value to online merchants and also may be used to collect a fee for facilitating completed purchase transactions with an online merchant from mobile devices. For example, a wireless communication service provider may be paid a fee per completed purchase from a mobile device or a percentage of total dollar purchase amounts from mobile devices, based on whether the purchase was completed by the mobile device via the customized online merchant payment form.

Thus, the present disclosure may provide advantages to several parties to the transaction. Advantages to a mobile device user may be the ease of using one, simple interface for making online purchases from various online merchants. In addition, this solution provides added security and control of the mobile device user's payment information. Importantly, none of the mobile device user's payment information is stored locally, either on the mobile device or the network access point. Thus, the mobile device user's payment information is not further exposed by using the common user interface provided by the wireless communications service provider. Advantages for the online merchant may be an increase in the volume of completed online purchase transactions from mobile devices leading to a higher conversion rate. Additional advantages for the online merchant may be processing more direct payments by cutting out "the middle man" or third party payment provider. These advantages for the online merchant may be obtained without having to integrate, test, and maintain customized forms with the wireless communications service provider. The following disclosure provides a method, device, and system that promote these advantages.

FIG. 1 illustrates a system 100 for customizing online merchant payment forms without merchant integration. In an embodiment, the system 100 comprises a mobile device 110, a media access gateway 120, an electronic wallet server 130, an online merchant 140, a payment service provider 150, a base transceiver station 160, and a network 170.

The mobile device 110 provides access to the internet via network 170. The mobile device 110 comprises a radio transceiver 112. The radio transceiver 112 provides the mobile device 110 the capability to access the network 170 wirelessly via the base transceiver station 160. The base transceiver station 160 may provide access to a network 170 via a digital or cellular radio access network. The base transceiver station 160 may provide a wireless communication link to the mobile device and/or the radio transceiver 112 using a code division multiple access (CDMA) wireless protocol, a global system for mobile communication (GSM) wireless protocol, a long term evolution (LTE) wireless protocol, a worldwide interoperability for microwave access (WiMAX) wireless protocol, or other cellular wireless protocol. The base transceiver station 160 may be any other type of wireless access point, for example, a wireless router in a home or wireless hotspot provided by a business or community to allow the mobile device 110 to access the network 170. The mobile device 110 may also access network 170 via a wire line connection if the mobile device 110 is so configured.

The mobile device 110 further comprises an electronic wallet application 114. The electronic wallet application 114 comprises several components, including a transaction monitor 116 and a form handler 118. A mobile device user may launch a web session with an online merchant 140 from within the electronic wallet application 114. The transaction monitor 116 of the mobile device 110 is able to detect that the online merchant 140 has transmitted a merchant-specific payment form to the mobile device 110 and intercepts display of the form in the browser. The electronic wallet application 114 is invoked after interception of the merchant-specific form and prompts the user to select payment type. The electronic wallet application 114 retrieves payment information associated with the selected payment type from the electronic wallet server 130. The form handler 118 automatically populates the merchant-specific payment form with the payment information and submits the completed form to the online merchant 140 to complete the purchase. The electronic wallet application 114 may record transaction specific information.

The electronic wallet browser plug-in 119 may be provided by the wireless communication service provider at the time the mobile device 110 is purchased. For example, the electronic wallet browser plug-in 119 may be bundled on mobile device 110 offered by the wireless communication service provider. As another option, the electronic wallet browser plug-in 119 may be downloaded and installed onto the mobile device 110 after purchase. The electronic wallet browser plug-in 119 is initiated when the mobile device 110 launches a session with an online merchant 140. The electronic wallet browser plug-in 119 may perform the same functions as form handler 118 from within a web browsing session. In an embodiment, the electronic wallet browser 119 intercepts a merchant-specific payment form and invokes the electronic wallet application 114. After the mobile device user selects the payment type and the electronic wallet application 114 retrieves the payment information associated with the selected payment type, the web browser plug-in 119 populates the fields of the merchant-specific form and submits the completed form to the online merchant 140 to complete the purchase.

The media access gateway 120 is an intermediate network element. The media access gateway 120 is a point of access from the mobile device 110 to network 170. The media access gateway 120 is also a termination point from the network 170 to the base transceiver station 160 which provides wireless communication with the mobile device 110. The communication between media access gateway 120 and the base transceiver station 160 may be provided by either wireless or wire line communication. The transaction monitor 126 is able to detect that the online merchant 140 has transmitted a merchant-specific payment form to the mobile device 110 and intercepts transmission of the form to the mobile device 110. The media access gateway 120 interfaces with the electronic wallet server 130 to retrieve the payment information associated with the payment type selected by the mobile device user. The form handler 128 automatically populates the payment form with the payment information as indicated by mobile device 110 and submits the completed form to the online merchant 140 to complete the purchase.

The online merchant 140 is a merchant that provides an online presence for users to shop for goods and/or services. The online merchant 140 provides a web-based shopping platform which allows a user to shop and purchase goods and/or services online via web pages provided by the online merchant 140. In particular, the online merchant 140 provides a unique, merchant-specific payment form for collecting payment information from an online shopper. To make a direct payment to an online merchant 140, the user may provide payment information directly to the online merchant 140 by entering payment information directly into the merchant-specific payment form. With direct payment from the user to the online merchant 140, no third-party payment service is involved in the payment transaction. An online merchant 140 that receives direct payment from a user may process the payment via payment service provider 150. The payment service provider 150 may settle the payment directly with online merchant 140. Additionally, in event that the online merchant 140 processes a refund to the user, the online merchant 140 may request the refund directly from the payment service provider 150.

The electronic wallet server 130 may be a computer system. According to the present disclosure, the electronic wallet server 130 may be accessed by the mobile device 110 and/or the media access gateway 120 with proper authorization by the mobile device 110. The electronic wallet server 130 stores payment information associated with payment types associated with a mobile device 110. Access to the electronic wallet server 130 by a user of the mobile device 110 may involve creating an account for the mobile device 110 and entering payment information for the account in advance of the mobile device 110 initiating a shopping session with an online merchant 140. The electronic wallet server 130 receives messages from a media access gateway 120 or a mobile device 110 containing information identifying and authenticating the mobile device 110. The electronic wallet server 130 verifies that the mobile device 110 is registered and authenticated. Once verification is complete, the electronic wallet server 130 may provide a list of payment types to either the mobile device 110 or the media access gateway 120 during a shopping session initiated by the mobile device 110. After providing the list of available payment types to the mobile device 110 or the media access gateway 120, either the mobile device 110 or the media access gateway 120 presents the list of payment types for display to the user of the mobile device 110 who may select a payment type for the online purchase transaction with the online merchant 140. Alternatively, the user of the mobile device 110 may select the payment type to use for a shopping session in advance of initiating the shopping session with an online merchant 140. The user may designate restrictions for using the selected payment type. For example, the user may specify that the payment type may be used for a limited time, e.g. 30 minutes, with a particular online merchant 140, etc.

Figure 2:
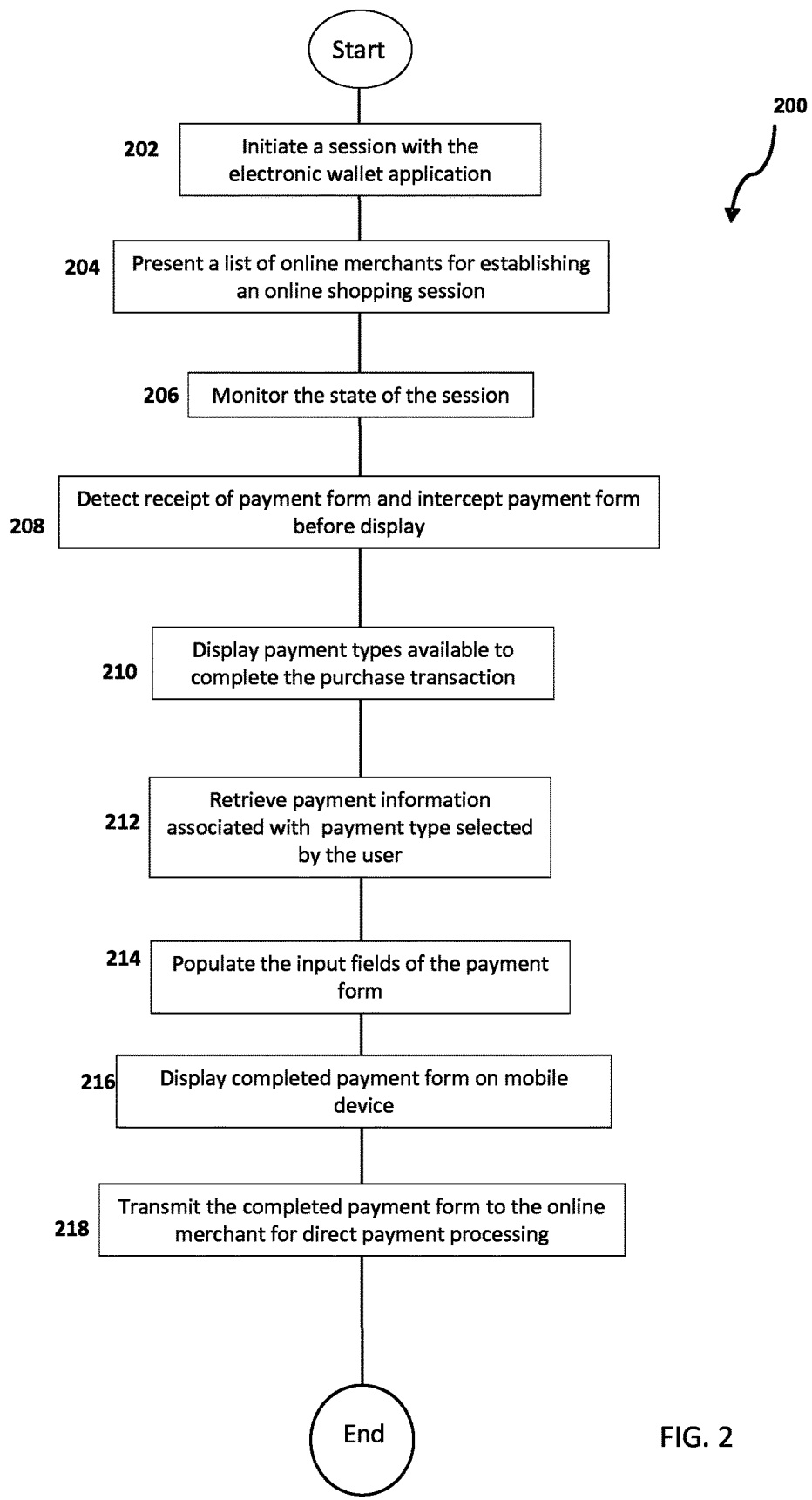
FIG. 2 is a flow chart illustrating a method according to an embodiment of the disclosure.

FIG. 2 is a flow chart of a method 200. In FIG. 2, an embodiment in which a user initiates an online shopping session from within the electronic wallet application 114 is shown. At step 202, the user of the mobile device 110 initiates execution of the electronic wallet application 114, for example, by clicking an icon representing the application. The user may input a user id and password to enter the electronic wallet application 114. At step 204, the electronic wallet application 114 may present a list of online merchants 140 for establishing an online shopping session. Each of the online merchants 140 in the list of merchants accessible from the electronic wallet application 114 may be pre-processed, or integrated, with the electronic wallet application by the wireless communications service provider, to allow customization of its respective merchant-specific payment form. Pre-processing, or integration, may include processing the online merchant payment form fields in order to provide an auto-population feature for each individual online merchant 140 in the list. The pre-processing may be performed by the wireless communication service provider with no integration, testing, or maintenance required of the online merchant 140. The user selects an online merchant 140 from the list of online merchants to begin an online shopping session. The online merchant's website is launched within the electronic wallet application 114, and the user may shop as if the user had gone directly to the online merchant's website. At step 206, the electronic wallet application 114 begins monitoring the state of the web session between the mobile device 110 and the online merchant 140.

When the user of the mobile device 110 makes a decision to purchase goods and/or services selected during the online shopping session, the user selects the appropriate "purchase" option on the online merchant's webpage and the mobile device 110 submits the request to the online merchant 140. In response, the online merchant 140 transmits a merchant-specific payment form to the mobile device 110 to collect payment information from the user. At step 208, the transaction monitor 116 detects receipt of the merchant-specific payment form from the online merchant 140. The merchant-specific payment form is intercepted by the transaction monitor 116 before being displayed on the mobile device 110 by the electronic wallet application 114.

At step 210, in response to detecting and intercepting the payment form, the electronic wallet application 114 displays a list of payment types in the electronic wallet account available to the mobile device 110 for completing the online purchase transaction. The user may select a payment type, and at step 212, the electronic wallet application 114 retrieves the payment information associated with the selected payment type from the electronic wallet server 130. At step 214, the form handler 118 of the electronic wallet application 114 automatically populates the merchant-specific payment form with user information and payment information. At step 216, the completed merchant-specific payment form is displayed on the mobile device 110. The form handler 118 may hide or suppress all or part of the payment information which may be displayed on the mobile device 110. The electronic wallet application 114 may request the user to review and confirm the user information and the payment information and to further finalize the purchase. When the user confirms the accuracy of the information and finalizes the purchase request, at step 218, the completed merchant-specific payment form is transmitted to the online merchant 140 for direct payment processing. Thus, the user of the mobile device 110 has been able to complete a purchase transaction with minimal input using the common user interface and does not need to complete the merchant-specific form. Additionally, the user's payment information is not stored locally at the mobile device at any time during or after completing the purchase, thereby maintaining security of the user's payment information.

Because the wireless communications service provider pre-processes, or integrates, the each merchant-specific payment form, it is possible that an online merchant 140 may modify its merchant-specific payment form while the electronic wallet application 114 may support the previous form. Therefore, the form handler 118 may verify that the fields of a pre-processed merchant-specific payment form match the fields of the current merchant-specific form before automatically populating the form with user and payment information. If the form handler 118 determines that the fields do not match, a notification may be provided to the user that automatic population feature may not be used to complete this purchase. In one embodiment, the form handler 118 may prompt the user whether he or she wishes to cancel the purchase transaction or to complete the merchant-specific payment form manually.

In an alternative embodiment, rather than access the list of online merchants 140 from the electronic wallet application 114, the list of online merchants may be readily accessible in a different application. For example, the different application may be an online shopping application or a marketplace application which provides the list of online merchants. The online shopping application or the marketplace application may interface with the electronic wallet application 114 to provide the common user interface and auto-population of merchant-specific forms.

Figure 3:
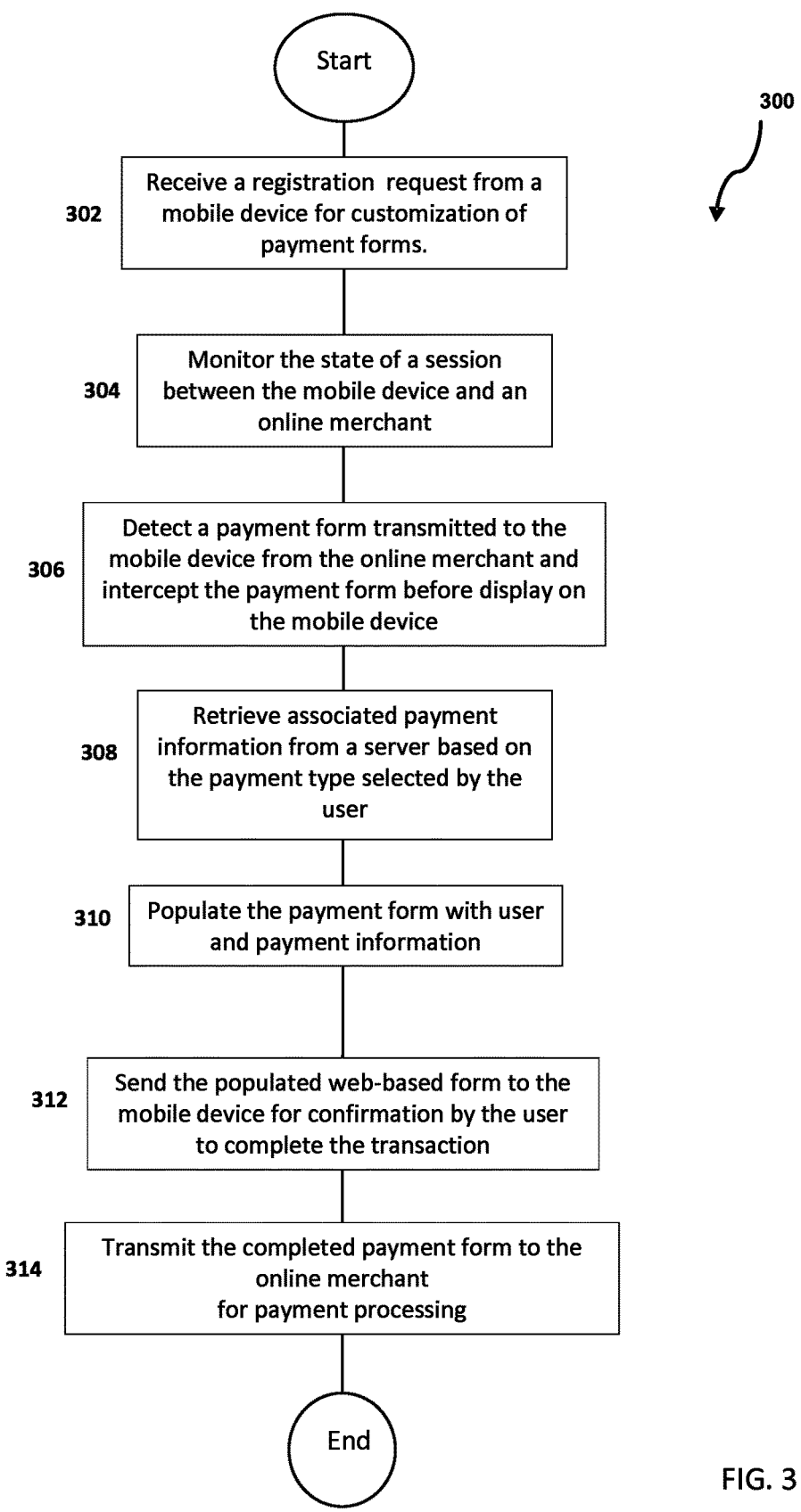
FIG. 3 is a flow chart illustrating another method according to an embodiment of the disclosure.

FIG. 3 is a flowchart of a method 300. In FIG. 3, an embodiment in which the media access gateway 120 performs customization of the online merchant's web-based forms from the network 170 is shown. As shown in FIG. 1, the mobile device 110 may access network 170 via the media access gateway 120. Mobile transactions performed by the mobile device 110 flow through the media access gateway 120. In an embodiment, the media access gateway 120 acts as a single point of insertion of payment information, for example, credit card information, into the merchant-specific web-based payment form. This allows the media access gateway 120 to monitor web-based transactions for all mobile devices 110.

Referring to FIG. 3, at step 302, the user pre-registers mobile device 110 with the media access gateway 120 prior to initiating an online shopping session with an online merchant 140. In one embodiment, the user logs in to the electronic wallet account for the mobile device 110 using the electronic wallet application 114, selects a payment type to use for the shopping session, and registers the information at the media access gateway 120. The user then initiates the shopping session by accessing the online merchant's website via a browser. At step 304, the transaction monitor 126 of the media access gateway 120 monitors the state of the session with the online merchant 140. In one embodiment, the media access gateway 120 monitors defined events of interest. In one embodiment, the media access gateway 120 may define the transition from an http session to a secure https session as an event of interest. When the user of the mobile device 110 makes a decision to purchase goods and/or services selected during the online shopping session, the online merchant 140 changes the session to a secure https session and transmits its merchant-specific payment form to the mobile device 110 to collect payment information from the user. At step 306, the transaction monitor 126 detects receipt of the merchant-specific payment form from the online merchant 140 based on the defined events of interest, for example, the change of the session from http to https. The media access gateway 120 may define additional events of interest that may be monitored by the transaction monitor 126. In one embodiment, the identity of the online merchant 140 participating in the session may be an event of interest. Once the media access gateway 120 detects the defined event(s) of interest, the media access gateway 120 intercepts the merchant-specific payment form before it is transmitted to the mobile device 110 for display in the browser.

At step 308, in response to detecting and intercepting the merchant-specific payment form, the media access gateway 120 retrieves the payment information associated with the registered payment type from the electronic wallet server 130. The media access gateway 120 may access the electronic wallet account of the mobile device 110 by using the phone number of the mobile device 110 and the information entered by the user during registration with the media access gateway 120 at the beginning of the session.

At step 310, the media access gateway 120 automatically populates the online merchant-specific payment form with user information and payment information. At step 312, the populated payment form is transmitted via a secure session to the mobile device 110 and is displayed in the browser on the mobile device 110. In one embodiment, the secure session may be an https session different from the https session initiated by the online merchant 140. However, the online merchant 140 is not aware that the media access gateway 120 has initiated a separate secure session. The media access gateway 120 may hide or suppress all or part of the payment information displayed to the user in the browser. The media access gateway 120 may request the user to review and confirm that the user information and payment information is correct. In an embodiment, the media access gateway 120 may provide its own payment form to the user for display at the mobile communications device 110 rather than displaying the payment form provided by the online merchant 140. When the user confirms the payment, a payment confirmation is sent to the media access gateway 120. At step 314, the completed payment form is transmitted to the online merchant 140 for direct payment processing with the payment service provider 150.

Figure 4:
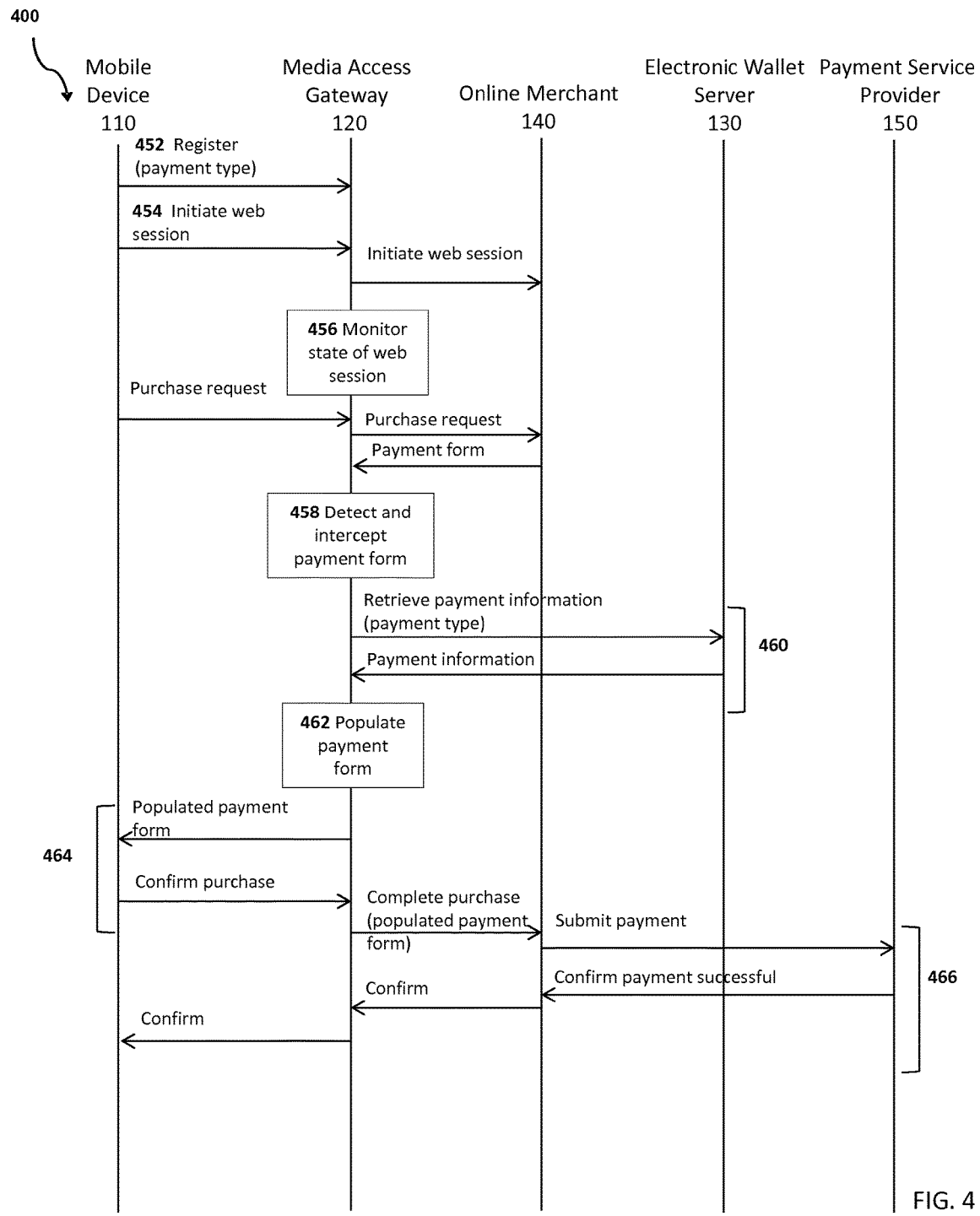
FIG. 4 is an illustration of a system flow according to an embodiment of the disclosure.

FIG. 4 depicts an example interaction of system components with respect to the media access gateway-based embodiment depicted in FIG. 3. In step 452, mobile device 110 registers with media access gateway 120 to use customized payment forms. Mobile device 110 may register a payment type to be used for subsequent purchases. In an embodiment, the user may register a payment type to be used for a defined period of time, e.g., 30 minutes. At step 454, the mobile device 110 initiates a session with an online merchant 140 via the media access gateway 120. The media access gateway 120 detects the session and begins monitoring the state of the session at step 456. In response to a purchase request made by the mobile device 110 during the session, the online merchant 140 transmits a merchant-specific payment form toward the mobile device 110 for the session. At step 458, the media access gateway 120 detects the merchant-specific payment form by monitoring defined events of interest and intercepting delivery of the payment form to the mobile device 110.

At step 460, the media access gateway 120 retrieves payment information from the electronic wallet server 130 associated with the payment type registered by mobile device 110. At, 462, the media access gateway 120 populates the merchant-specific payment form with the user information and payment information retrieved from the electronic wallet server 130.

At 464, media access gateway 120 transmits the populated merchant-specific payment form to mobile device 110 or alternatively, transmits a payment form unique to the media access gateway 120, to mobile device 110. The media access gateway 120 may suppress some or all of the payment information in the populated payment form for display on mobile device 110. At step 466, the media access gateway 120 receives confirmation of the purchase from mobile device 110 and transmits the completed merchant-specific payment form to the online merchant 140. The online merchant 140 then processes the payment directly with the payment service provider 140. Confirmation of payment is provided to the mobile device 110 and displayed in the browser to the user. Additionally, the user's payment information is not stored locally at the mobile device 110 or the media access gateway 120 at any time during or after completing the purchase, thereby maintaining security of the user's payment information.

Figure 5:
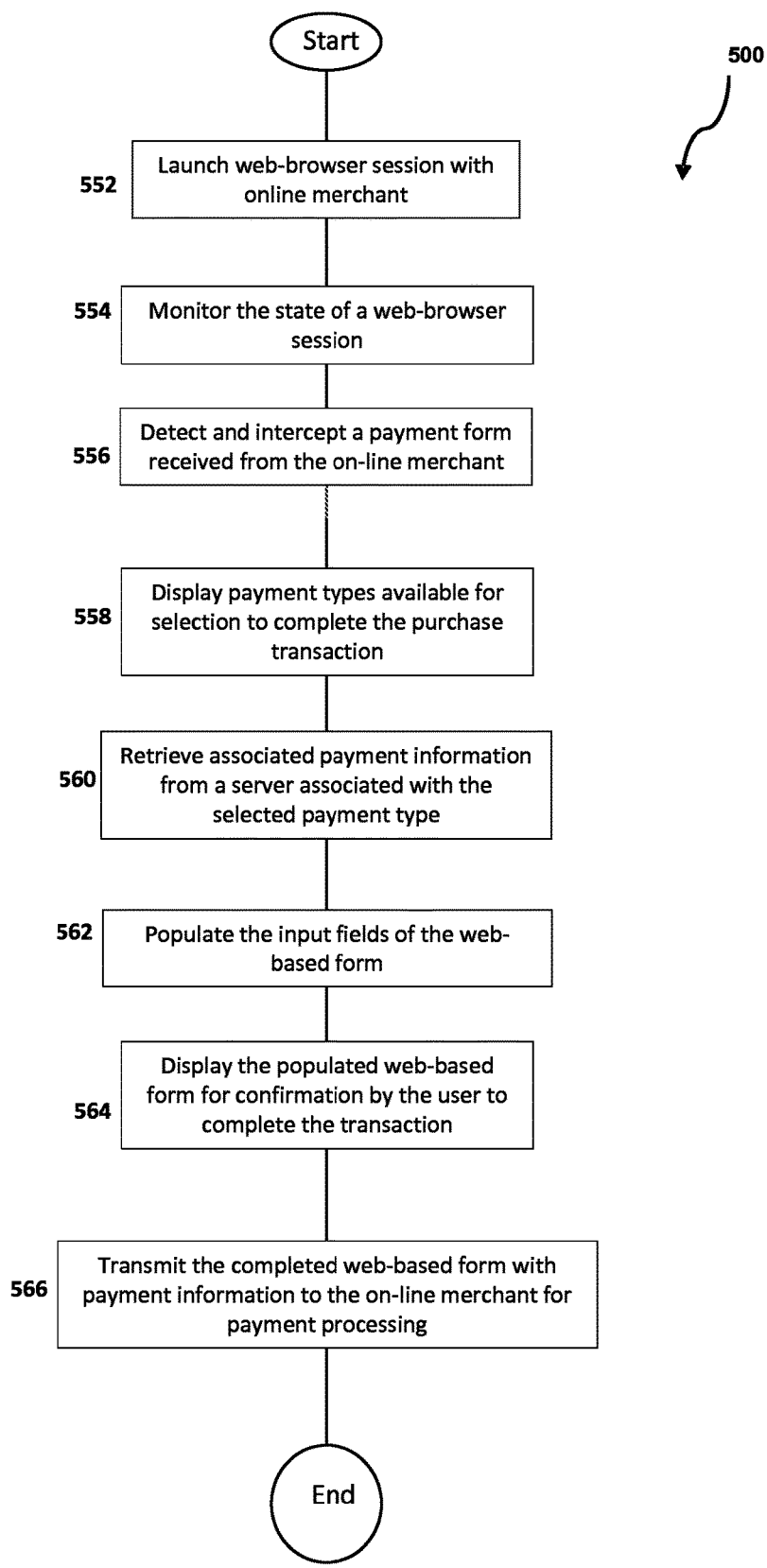
FIG. 5 is a flow chart illustrating another method according to an embodiment of the disclosure.

FIG. 5 is a flowchart of method 500. In FIG. 5, an embodiment in which customizing the online merchant-specific payment form is provided by a web browser plug-in 119 is shown. The web browser plug-in 119 is pre-loaded on the mobile device 110 by a wireless communications service provider in conjunction with OEMs who manufacture the mobile devices 110. In one embodiment, at step 552, the user initiates the shopping session by launching the online merchant's website directly from a web browser rather than via the electronic wallet application 114, as discussed with respect to FIG. 2. At step 554, the state of the web session is monitored from the browser plug-in 119. The browser plug-in 119 may be configured to monitor particular events of interest. In one embodiment, the events of interest may include detecting a transition from an http session to a secure https session and/or detection of loading a page with blank fields into the browser. In another embodiment, the events of interest may include that the payment form originated from a particular online merchant. When the user of the mobile device 110 makes a decision to purchase goods and/or services selected during the online shopping session, the online merchant 140 transmits its merchant-specific payment form to the mobile device 110 to collect payment information from the user. The merchant-specific payment form contains blank fields. At step 556, the browser plug-in 119 detects receipt of the payment form from the online merchant 140 based on detecting the events of interest that have been defined. The merchant-specific payment form is intercepted before being displayed in the browser on the mobile device 110.

At step 558, the browser plug-in 119 triggers payment assistance for the mobile device 110. In one embodiment, the browser plug-in 119 queries the user of the mobile device 110 if the user would like to pay from the electronic wallet account. The user may accept or decline to use electronic wallet account of the mobile device 110 for payment. If the user elects to use the electronic wallet account of the mobile device 110, the browser plug-in 119 interfaces with the electronic wallet application 114. The user may be prompted to enter the user id and password of the electronic wallet account for the mobile device 110 in order for the electronic wallet application 114 to access the electronic wallet account. The electronic wallet application 114 accesses the electronic wallet account of the mobile device 110 and presents payment types available for completing the online purchase transaction. The user selects the payment type, and at step 560, the electronic wallet application 114 retrieves the payment information associated with the payment type from the electronic wallet server 130. At step 562, the browser plug-in 119 automatically populates the merchant-specific payment form with user information and payment information. At step 564, the browser plug-in 119 populates the merchant-specific payment form and displays the populated merchant-specific form in the browser on the mobile device 110. All or part of the payment information may be suppressed in the browser display. The user may be requested to review and confirm that the user information and payment information is correct. When the user confirms the payment information and submits the payment request, at step 566, the confirmed payment form is transmitted to the online merchant 140 for direct payment processing. Thus, the user of the mobile device 110 has been able to complete a purchase transaction with minimal input using the common user interface and does not need to complete the merchant-specific form. Additionally, the user's payment information is not stored locally at the mobile device 110 at any time during or after completing the purchase, thereby maintaining security of the user's payment information.

Monitoring a shopping session between a user of mobile device 110 and an online merchant 140 allows additional information about purchases from mobile devices 110 to be collected. Information that may be collected and recorded may include a transaction identifier; whether a purchase transaction completed successfully and the amount of the purchase, whether a purchase was not completed and the reason the purchase was not being completed. Reasons for a purchase not being completed may include that the session was abandoned by the user when it did not complete the form or for another other error. The information collected may not identify any one particular mobile device 110 or user of the mobile device 110 or include any secure payment information used to complete a purchase. In one embodiment, the amount of a purchase transaction may be collected as part of a total amount of purchase transactions successfully completed. In one embodiment, when the monitoring of the shopping session is performed by the media access gateway 120, the media access gateway 120 may monitor all shopping sessions flowing through the media access gateway 120. The media access gateway 120 may then be able to collect this information in the aggregate for all mobile devices 110.

Figure 6:
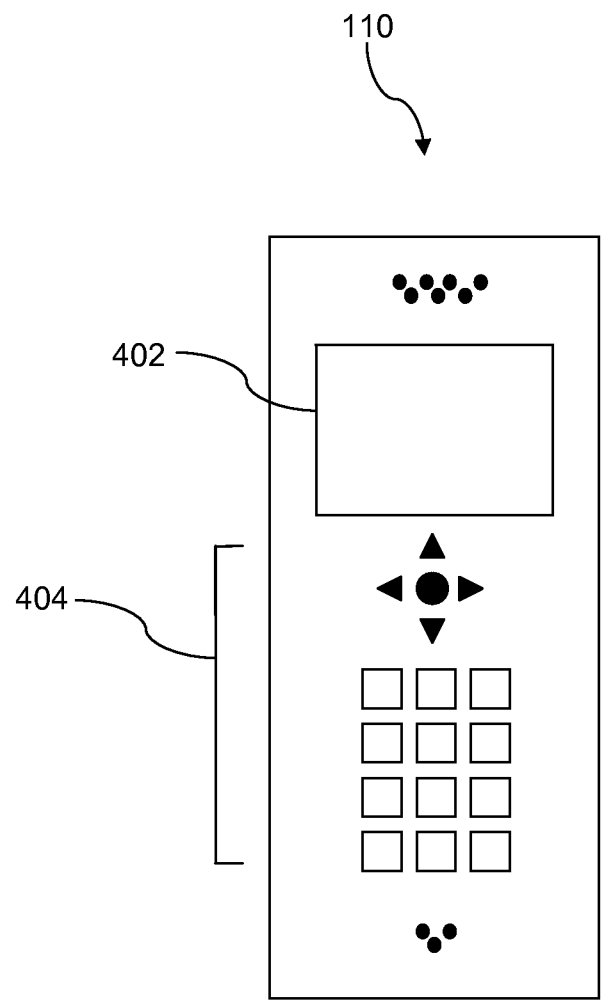
FIG. 6 is an illustration of a mobile device according to an embodiment of the disclosure.

FIG. 6 illustrates the mobile device 110 as embodied as a handset, but the present disclosure should not be limited to this embodiment. Though illustrated as a mobile phone, the mobile device 110 may take various forms including a wireless handset, a pager, a personal digital assistant (PDA), a gaming device, or a media player. The mobile device 110 includes a display 402 and a touch-sensitive surface and/or keys 404 for input by a user. The mobile device 400 may present options for the user to select, controls for the user to actuate, and/or cursors or other indicators for the user to direct. The mobile device 110 may further accept data entry from the user, including numbers to dial or various parameter values for configuring the operation of the handset. The mobile device 110 may further execute one or more software or firmware applications in response to user commands. These applications may configure the mobile device 110 to perform various customized functions in response to user interaction. Additionally, the mobile device 110 may be programmed and/or configured over-the-air, for example from a wireless base station, a wireless access point, or a peer mobile device 110. The mobile device 110 may execute a web browser application which enables the display 402 to show a web page. The web page may be obtained via wireless communications with a base transceiver station, a wireless network access node, a peer mobile device 110 or any other wireless communication network or system.

Figure 7:
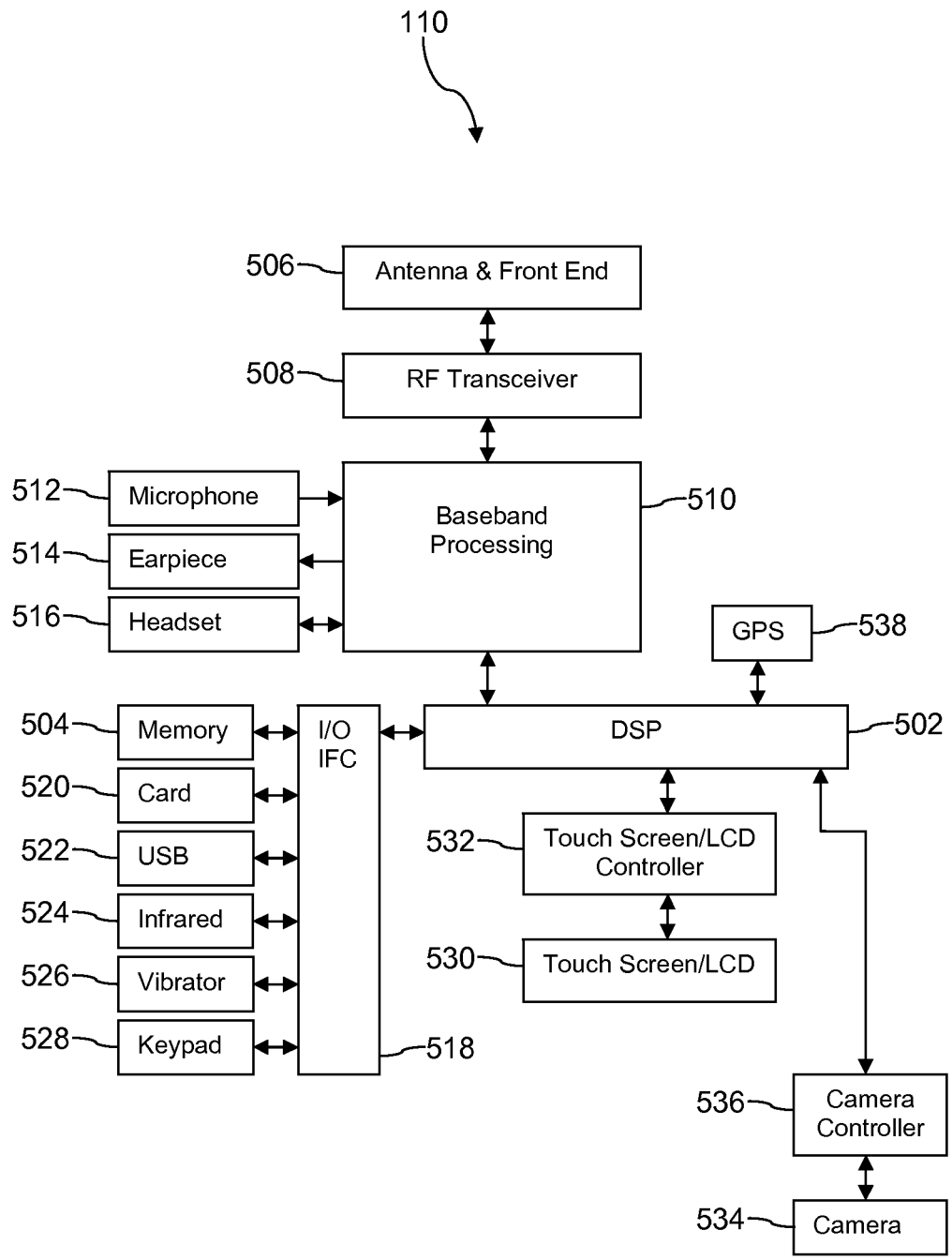
FIG. 7 is a block diagram of a mobile device according to an embodiment of the disclosure.

FIG. 7 shows a block diagram of the mobile device 110. While a variety of known components of handsets are depicted, in an embodiment a subset of the listed components and/or additional components not listed may be included in the mobile device 110. The mobile device 110 includes a processor, such as, a digital signal processor (DSP) 502 and a memory 504. In some embodiments, the processor may comprise one or more of a microprocessor, a digital signal processor, a field programmable gate array (FPGA), a complex programmable logic device (CPLD), a programmable logic device (PLD), an application specific integrated circuit (ASIC), and/or other logic devices. As shown, the mobile device 110 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 110 may include another kind of display that does not provide a touch sensitive screen. In an embodiment, the DSP 502 may communicate directly with the memory 504 without passing through the input/output interface 518. Additionally, in an embodiment, the mobile device 110 may comprise other peripheral devices that provide other functionality.

The DSP 502 or some other form of controller or central processing unit operates to control the various components of the mobile device 110 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 110 to function as a peripheral device to exchange information with a personal computer or other computer system. The infrared port 524 and other optional ports such as a Bluetooth® interface or an IEEE 802.11 compliant wireless interface may enable the mobile device 110 to communicate wirelessly with other nearby handsets and/or wireless base stations.

The keypad 528 couples to the DSP 502 via the interface 518 to provide one mechanism for the user to make selections, enter information, and otherwise provide input to the mobile device 110. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 110 to determine its position.

Figure 8A:
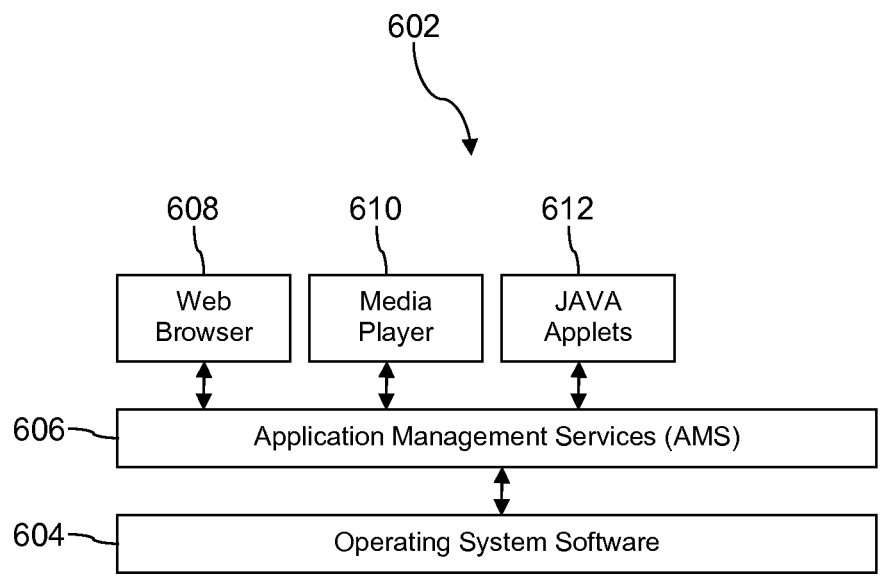
FIGS. 8A and 8B are block diagrams of a software configuration for a mobile device according to an embodiment of the disclosure.

FIG. 8A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 110. Also shown in FIG. 6A are a web browser application 608, a media player application 610, and JAVA applets 612. The web browser application 608 may be executed by the mobile device 110 to browse content and/or the Internet, for example when the mobile device 110 is coupled to a network via a wireless link. The web browser application 608 may permit a user to enter information into forms and select links to retrieve and view web pages. The media player application 610 may be executed by the mobile device 110 to play audio or audiovisual media. The JAVA applets 612 may be executed by the mobile device 110 to provide a variety of functionality including games, utilities, and other functionality.

Figure 8B:
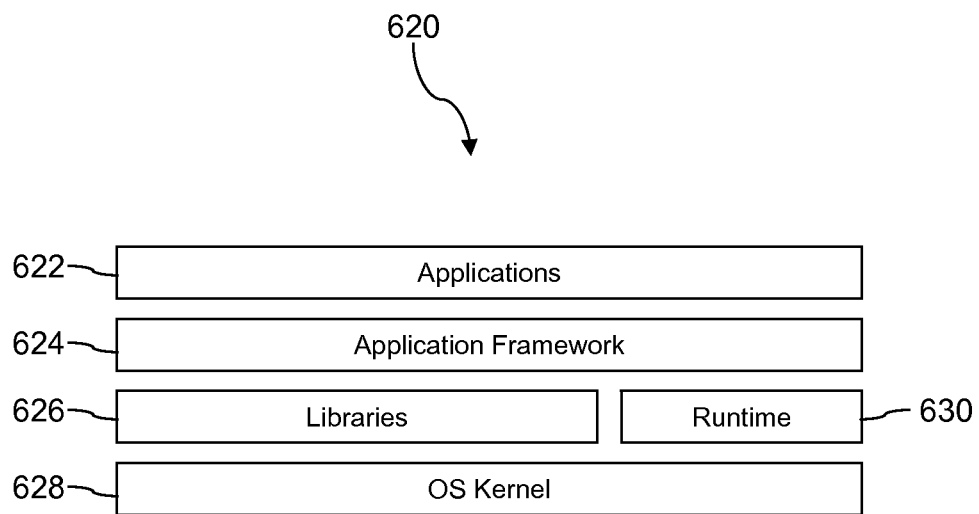

FIG. 8B illustrates an alternative software environment 620 that may be implemented by the DSP 502. The DSP 502 executes operating system software 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 9:
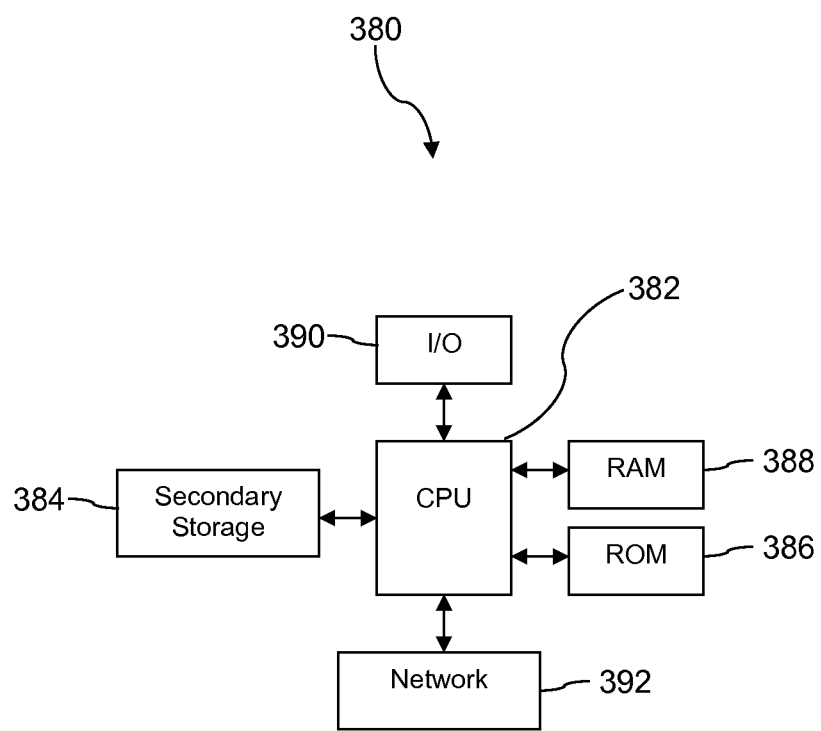
FIG. 9 illustrates an exemplary computer system suitable for implementing some aspects of the several embodiments of the disclosure.

FIG. 9 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well known to one skilled in the art. The baseband signal and/or signal embodied in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A mobile device for simplifying a purchase transaction, comprising:
   a memory;
   a processor; and
   an application stored in the memory that, when executed by the processor
      monitors a state of a web-based session between the mobile device and an online merchant;
      intercepts a payment form received from an online merchant for entering payment information to complete the purchase transaction with the online merchant, wherein intercepting the payment form is in response to detecting a pre-determined event, the predetermined event comprising the web-based session being switched from a regular web-based session to a secure web-based session;
      displays a list of one or more payment types available for selection to complete the purchase transaction;
      retrieves associated payment information from a server based on the payment type selected by a user from the list of one or more payment types;
      populates fields of the payment form with the retrieved payment information;
      displays the populated payment form to the user for confirmation to complete the purchase transaction; and
      submits the populated payment form to the online merchant based on the confirmation from the user.

2. The mobile device of claim 1, wherein the application further records information related to the purchase transaction, wherein the information recorded is at least one of: the transaction completed successfully, the transaction was not completed successfully, the amount of a successful transaction, and a transaction identifier.

3. The mobile device of claim 1, wherein the application further suppresses at least some of the payment information displayed on the mobile device after population.

4. The mobile device of claim 1, wherein the pre-determined event further comprises the online merchant being a participating merchant.

5. The mobile device of claim 1, wherein the list of one or more payment types is associated with an electronic wallet account of the mobile device.

6. The mobile device of claim 1, wherein displaying the list of one or more payment types available for selection to complete the purchase transaction is transparent to the online merchant.

7. A processor-implemented method for simplifying online purchase transactions, comprising:
   presenting a list of one or more online merchants to a user of a mobile device for establishing an online shopping session, the one or more online merchants pre-processed to support simplifying online purchase transactions;
   intercepting a checkout page received from one of the one or more online merchants, the checkout page containing fields for entering payment information to complete the online purchase transaction with the one of the one or more online merchants during the established online shopping session, wherein intercepting the checkout page is in response to detecting a pre-determined event, the predetermined event comprising a web-based session being switched from a regular web-based session to a secure-web-based session;

displaying one or more payment types available for selection to complete the online purchase transaction with the one of the one or more online merchants;

retrieving associated payment information from a server based on the payment type selected from the one or more payment types by the user;

populating the fields of the checkout page with the retrieved payment information;

displaying the populated checkout page to the mobile device user for confirmation to complete the online purchase; and submitting the populated checkout page to the one of the one or more of online merchants.

8. The method of claim 7, wherein the one or more payment types are defined by the user in an electronic wallet account for the mobile device and the one or more payment types are available for selection when the user logs in to the electronic wallet account.

9. The method of claim 7, further comprising, detecting a confirmation received from the one of the one or more online merchants that the web-based purchase transaction completed successfully in response to transmitting the populated checkout page to the one of the one or more online merchants; and recording information related to the online purchase transaction in response to detecting the confirmation, wherein the information related to the online purchase transaction comprises at least one of transaction completed successfully, the transaction was not completed successfully, the amount of a successful transaction, and a transaction identifier.

10. The method of claim 7, wherein the populated checkout page suppresses at least some of the payment information to the user on displaying the checkout page.

11. The method of claim 7, wherein intercepting the checkout page is performed by an electronic wallet application or a web browser plug-in on the mobile device.

12. The method of claim 7, wherein displaying one or more payment types available for selection to complete the online purchase transaction is transparent to the one of the one or more online merchants.

13. The method of claim 7, wherein the payment information comprises at least one of credit card information, debit card information, and shipping address.

14. A media access gateway device for simplifying completion of online purchase transactions, comprising:

a memory;

a processor; and an application stored in the memory that, when executed by the processor monitors the state of a web-based purchase transaction between a mobile device and an online merchant;

detects, based on the state of the web-based purchase transaction, a form received from the online merchant for entering payment information to complete an online purchase transaction with the online merchant, wherein detecting the form is based on detecting pre-defined events comprising detecting a transition of the web-based transaction to a secure session;

retrieves payment information associated with a payment type from a server based on selection of the payment type from a list of payment types by a user for completing the online purchase transaction;

populates the input fields of the form with the retrieved payment information;

provides the populated form to the mobile device for confirmation from the user to complete payment for the online purchase transaction using the selected payment type and the associated payment information; and submits the populated form to the online merchant.

15. The media access gateway device of claim 14, wherein the application further:

intercepts the session between the mobile device and the online merchant in response to detecting the form; and creates a new secure session with the mobile device for providing the populated form to the mobile device.

16. The media access gateway device of claim 14, wherein the application further records information related to the online purchase transaction in response to detecting the confirmation before sending the confirmation to the mobile device.

17. The media gateway device of claim 14, wherein the application further receives, from the mobile device, prior to initiating the online purchase transaction, a payment type selected by a user from an electronic wallet account to be used for the online purchase transaction with the online merchant.

18. The media access gateway of claim 14, wherein displaying the list of one or more payment types available for selection to complete the online purchase transaction is transparent to the online merchant.

\* \* \* \* \*